United States Patent
Bhattacharya et al.

(10) Patent No.: US 7,376,148 B1
(45) Date of Patent: May 20, 2008

(54) METHOD AND APPARATUS FOR IMPROVING VOICE QUALITY IN A PACKET BASED NETWORK

(75) Inventors: Jisu Bhattacharya, Fremont, CA (US); Sarang Wagholikar, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 823 days.

(21) Appl. No.: 10/765,540

(22) Filed: Jan. 26, 2004

(51) Int. Cl.
   *H04J 3/16* (2006.01)
(52) U.S. Cl. .................. 370/466; 370/395.64; 370/517
(58) Field of Classification Search ................ 370/463, 370/465, 466, 469–476, 493–496, 509, 510, 370/514, 535, 537–540, 516, 517, 395.1, 370/399, 395.6, 61, 395.64; 709/231, 236, 709/223–227, 221; 379/406.01, 406.03, 379/406.08, 386, 88.01, 88.07–88.1, 392.01–395.01; 704/233

See application file for complete search history.

(56) References Cited

U.S. PATENT DOCUMENTS

| | | | | |
|---|---|---|---|---|
| 5,870,397 A | * | 2/1999 | Chauffour et al. | .......... 370/435 |
| 6,229,821 B1 | * | 5/2001 | Bharucha et al. | ........... 370/471 |
| 6,282,196 B1 | * | 8/2001 | Lyons et al. | ................. 370/394 |
| 6,345,056 B1 | * | 2/2002 | Bharucha et al. | ........... 370/474 |
| 6,438,131 B1 | * | 8/2002 | Gerber et al. | .......... 370/395.61 |
| 6,747,977 B1 | * | 6/2004 | Smith et al. | ........... 370/395.64 |
| 2003/0028661 A1 | * | 2/2003 | Burger et al. | ................ 709/231 |
| 2003/0099240 A1 | * | 5/2003 | Lee | .......................... 370/395.1 |

OTHER PUBLICATIONS

ITU-T I.366.2, AAL type 2 service specific convergence suglayer for trunking, Feb. 1999, ITU-T, pp. 6,10,11,1,20.*

* cited by examiner

*Primary Examiner*—Doris H. To
*Assistant Examiner*—Ian N. Moore
(74) *Attorney, Agent, or Firm*—Stolowitz Ford Cowger LLP

(57) ABSTRACT

Some embodiments adaptively adjust to the current call load in a packet based virtual circuit to minimize the delay experienced by the first packets of any talk spurt for a particular active call. Some embodiments minimize the jitter introduced by multiplexing voice packets by smoothing out the waiting time experienced by each of the voice packets. Some embodiments effectively minimize jitter when the number of active calls on a virtual circuit drops off suddenly. Some embodiments are able to differentiate signaling packets indicating a telephony event from voice packets and give the signaling packets expedited processing with no delay contributed by the subcell multiplexing process. Other embodiments are described in the claims.

15 Claims, 2 Drawing Sheets

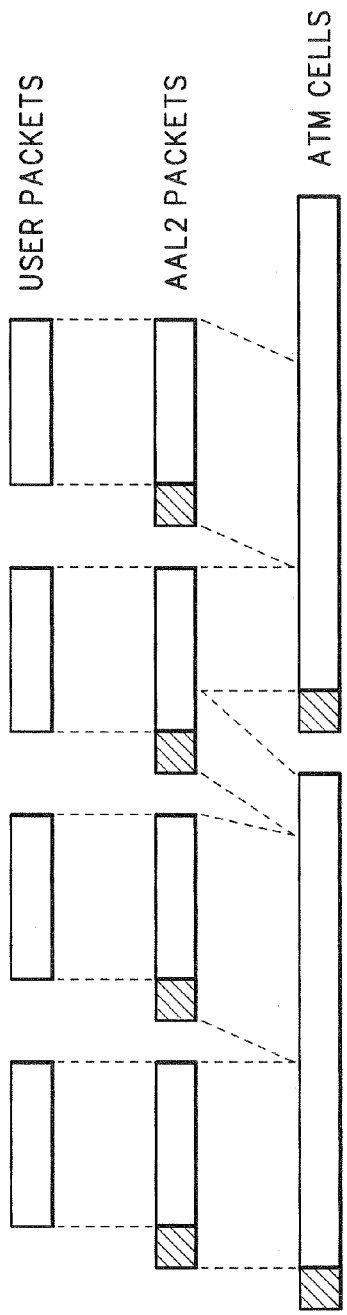
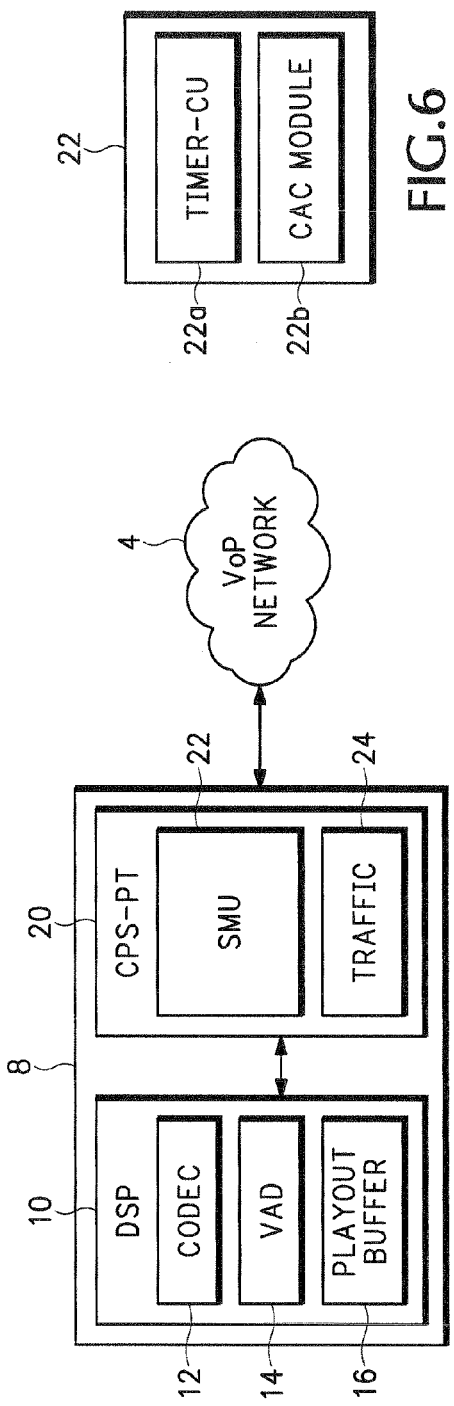

METHOD AND APPARATUS FOR IMPROVING VOICE QUALITY IN A PACKET BASED NETWORK

BACKGROUND OF THE INVENTION

1. Technical Field of the Invention

This invention relates generally to communication networks, and more particularly, to a method and apparatus for decreasing the jitter and average delay experienced by voice packet streams while also conserving bandwidth in a packetized network.

2. Description of the Related Art

In Voice over Packet (VoP) network systems, the end to end network delay and the variation in the time between packets arriving, caused by network congestion, timing drift, or route changes (also known as jitter variation) are important quantities to consider when providing an acceptable level of Quality of Service (QoS) for the delay sensitive voice traffic flow.

FIG. 1 is a block diagram conceptually illustrating the sources of delay and jitter in a VoP network. FIG. 1 shows an originating gateway 2, a VoP network 4, and a destination gateway 6.

A gateway is a network point that acts as an entrance to another network. On the Internet, a node or stopping point can be either a gateway node or a host (end-point) node. Both the computers of Internet users and the computers that serve pages to users are host nodes. The computers that control traffic within a company's network or at a local Internet service provider (ISP) are gateway nodes. A gateway is often associated with both a router, which knows where to direct a given packet of data that arrives at the gateway, and a switch, which furnishes the actual path in and out of the gateway for a given packet. The above definitions are basic and well-known to network engineers.

In the diagram of FIG. 1, the sources of delay and jitter variation are threefold. First, on the originating gateway 2, delay and jitter is contributed by voice and DSP processing. Secondly, delay and jitter are contributed by elements of the voice gateway 2 that multiplex the voice packets. Thirdly, additional delay and jitter is contributed by all the network elements in the VoP network 4 between the originating voice gateway 2 and the destination voice gateway 6.

Many carriers use Voice over ATM Adaptive Layer 2 (VoAAL2) trunks for supporting their wireless networks. A typical scenario involves ATM trunks being established between the Mobile Switching Centers (MSCs) in order to carry the voice traffic collected by wireless Base Switching Centers (BSCs). These trunks offer a means to transport huge quantities of voice data with good bandwidth savings.

However, many times these trunks go through some ATM clouds (included in the VoP network 4) that are under a different carrier's control. In this situation, where there are multi-carrier segments in the VoP network 4, one carrier loses the ability to have total control of the delay and jitter performance because the third source of delay and jitter described above is no longer attributable to the one carrier.

Embodiments of the invention address this and other disadvantages of the conventional art.

BRIEF DESCRIPTION OF THE SEVERAL VIEWS OF THE DRAWINGS

FIG. 4 is a diagram that illustrates a multiplexing process compatible with embodiments of the invention.

FIG. 5 is a block diagram illustrating an example voice gateway that is compatible with embodiments of the invention.

FIG. 6 is a block diagram illustrating an example subcell multiplexing unit according to some embodiments of the invention.

DETAILED DESCRIPTION OF THE INVENTION

Figure 1:
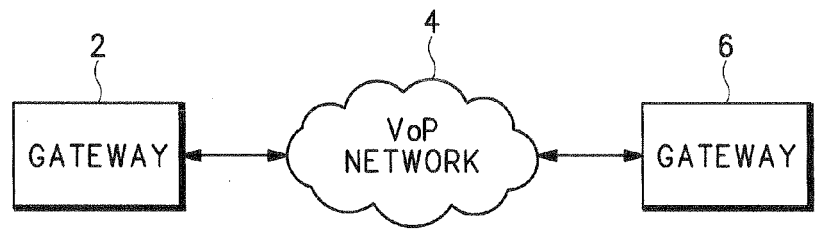
FIG. 1 is a block diagram conceptually illustrating the sources of delay and jitter in a VoP network.

In the early 1970's, telephone began using a time division multiplexed (TDM) communications system, known as D4, that used a channel bank to multiplex and communicate time division multiplexed (TDM) voice signals over a communications link, such as a T1 link. The channel bank typically carried 24 digital voice signals between central telephone offices using only one pair of wires in each direction instead of the normal 24 pairs of wires required to communicate the 24 voice signals in analog form. This capability was achieved by digitizing and time division multiplexing the 24 analog voice signals into 24 channels or timeslots. In the TDM system, each of the channels is allocated a predetermined, equal amount of time (corresponding to a predetermined bandwidth) within each frame of the T1 link to communicate any data. Each channel is always allocated its predetermined amount of time, even if that channel has no voice data to transmit. In addition to communicating voice signals, these systems may also communicate digital data because the D4 system was designed to handle digital data. The systems are still widely used today to carry voice traffic between central telephone offices.

A typical time division multiplexed (TDM) system, such as the D4 system, has a data rate of 1.544 million bit per second (Mbps) wherein timeslots of 64 Kbps are fixedly allocated to each channel unit. The 1.544 Mbps data rate is typically known as a T1 carrier.

Because conventional channel banks, such as the D4 system, have allocated fixed time slots for each channel, these systems suffer from an inefficient use of bandwidth and cannot dynamically allocate that bandwidth. For example, if one or more channels do not have any voice or data signals to transmit at a particular time, the timeslot assigned to that channel unit in the T1 frame is unused. In addition, if a particular channel has a need for more bandwidth than the allocated time slot, the TDM system does not allow that channel to request or receive any extra bandwidth.

Due to the above shortcomings, a number of alternative packet-based communications systems, such as asynchronous transfer mode (ATM), X.25 protocol, and frame relay, were developed that do not assign fixed timeslots to each channel, but dynamically allocate bandwidth according to need. These packet-based communications systems are best used for digital data because digital data tends to be communicated in bursts. For example, a user sending a computer file that is 100 Kbytes long will need to send the entire 100 Kbytes as quickly as possible, but then will not require any more bandwidth until another transmission.

These packetized communications systems permit the total bandwidth of the communications link to be allocated in any manner depending on the need of the channels. For example, a single channel may use the entire bandwidth for several seconds because that channel has high priority digital data, such as an e-mail message or a computer file, which must be transmitted immediately.

With reference to an ATM packet network, ATM standards define two types of ATM connections: virtual path connections (VPCs), which contain virtual channel connections (VCCs). A virtual channel connection (or virtual circuit) is the basic unit, which carries a single stream of cells, in order, from user to user. A collection of virtual circuits can be bundled together into a virtual path connection. A virtual path connection can be created from end-to-end across an ATM network. In this case, the ATM network does not route cells belonging to a particular virtual circuit. All cells belonging to a particular virtual path are routed the same way through the ATM network, thus resulting in faster recovery in case of major failures.

An ATM network also uses virtual paths internally for the purpose of bundling virtual circuits together between switches. Two ATM switches may have many different virtual channel connections between them, each belonging to different users. These can be bundled by the two ATM switches into a virtual path connection. This can serve the purpose of a virtual trunk between the two switches. This virtual trunk can then be handled as a single entity by, perhaps, multiple intermediate virtual path cross connects between the two virtual circuit switches.

Virtual circuits (VCs) can be statically configured as permanent virtual circuits (PVCs) or dynamically controlled via signaling as switched virtual circuits (SVCs). They can also be point-to-point or point-to-multipoint, thus providing a rich set of service capabilities. SVCs are the preferred mode of operation because they can be dynamically established, thus minimizing reconfiguration complexity.

Figure 2:
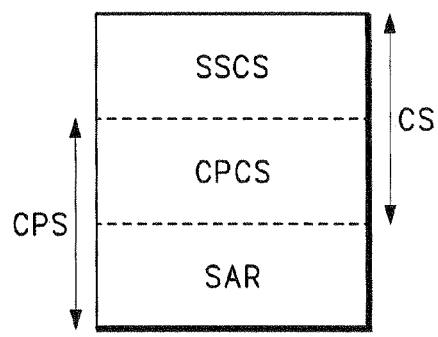
FIG. 2 is a diagram illustrating the protocol for an ATM adaptation layer.

For most applications, ATM itself is not directly used. Instead, most applications use an ATM adaptation layer (AAL) that is suited to their data generation patterns. FIG. 2 is a diagram that illustrates AAL protocol that is compatible with embodiments of the invention. ITU-T recommendation I.362 specifies that AALs are divided into two sub-layers: the "convergence sublayer" (CS) and the "segmentation and reassembly sublayer" (SAR). The CS is further divided into a "common part convergence sublayer" (CPCS) and a "service specific convergence sublayer" (SSCS). The CPCS is common to all the instances of a specific AAL, the SSCS depends on the application to be supported. Therefore, only one CPCS is defined per AAL while many SSCS can be specified for the same AAL. The CPCS and the SAR together form the common part sublayer (CPS) of the AAL.

ATM adaptation layer 2 (AAL2) was developed to adapt the capabilities of ATM to the traffic requirements of low and variable bit rate applications such as compressed voice used in cellular communications.

Figure 3:
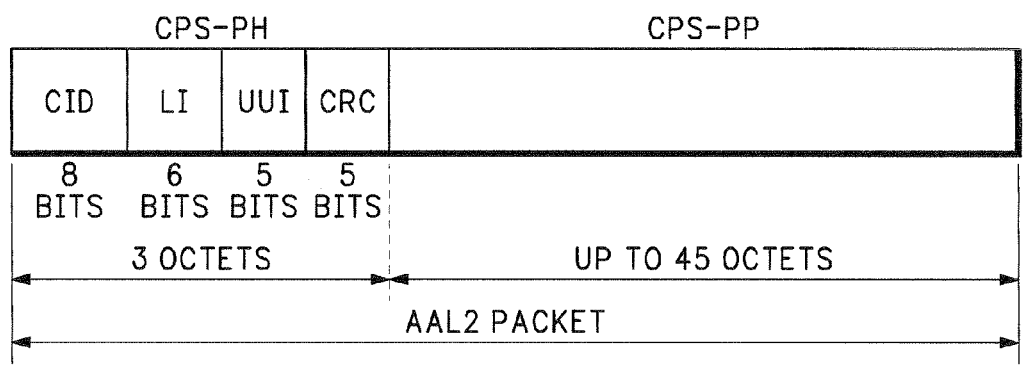
FIG. 3 is a diagram illustrating the common part of an AAL2 packet compatible with embodiments of the invention.

FIG. 3 is a diagram illustrating the common part of an AAL2 packet compatible with embodiments of the invention. The packet consists of a 3 octet (one octet=8 bits) packet header (CPS-PH) and up to a 45 octet payload (CPS-PP). The actual length of the payload is indicated in the "length indicator" (LI) field. The "user to user" (UUI) field is included so that upper layers (users) may transparently convey information. For example, some SSCSs use the UUI field to convey a sequence number and/or the type of voice-codec used. An 8 bit "channel identifier" (CID) identifies individual AAL2 connections inside an AAL2 link. The AAL2 packets corresponding to the same active voice call will all possess the same CID field. The 5 bit CRC field protects the packet header from transmission errors, but the payload is not protected.

In Voice over AAL2 (VoAAL2) applications, multiple voice calls are supported by multiplexing packets from several AAL2 connections inside the payload of the ATM cells of the AAL2 link. FIG. 4 is a diagram that illustrates this multiplexing process. Referring to FIG. 4, User Packets, the lengths of which are negotiated per individual AAL2 connections, become the payload of AAL2 packets. The AAL2 packets are in turn multiplexed into the ATM cells and transmitted over the VC. Thus the AAL2 packets become the payload of the ATM cells.

More often than not, the payloads of the ATM cells are only partially filled. Because the voice communications are time sensitive, eventually a partially filled ATM cell must be forwarded onwards anyway without waiting for any more AAL2 packets that would completely fill the cell.

Conventionally, in order to save bandwidth, a fixed timer dictates the maximum time for which a AAL2 packet is held in a partially filled ATM cell until the ATM cell is scheduled for transmission. If it is not possible to fill the ATM cell within the fixed timer period, the ATM cell is forwarded anyway despite being only partially filled. The process described above, of multiplexing AAL2 packets in ATM cells, may be referred to as AAL2 sub-cell multiplexing.

In sub-cell multiplexing, a fixed timer value may work well when there is a high number of active voice calls present on the VC, so that the AAL2 packets are getting filled in a regular fashion and the average delay experienced by any packet before the cell is fully filled and sent out to the network is more or less constant. However, any variation in the average delay experienced by the packets in the AAL2 sub-cell multiplexer essentially introduces jitter in the voice packet stream for the call. This situation becomes increasingly likely when the number of active calls supported by any VC suddenly drops from a relatively high number to a relatively low number.

FIG. 5 is a block diagram illustrating an example voice gateway that is compatible with embodiments of the invention. Voice gateway 8 includes a digital signal processor (DSP) 10 and a Common Part Sublayer Packet Transmitter (CPS-PT) 20. The DSP 10 includes a coder/decoder (codec) 12, a Voice Activity Detector (VAD) 14, and a playout buffer 16. The functions of the codec 12 and playout buffer 16 are well known to those of skill in the art and so will not be explained in further detail here.

The VAD 14 monitors signal level thresholds from each of the active calls (or CIDs) that is currently being serviced by the VC. For each CID, the VAD 14 typically has two states: VAD_ON and VAD_OFF. If the signal level is below a predetermined threshold, corresponding to a situation where there is no voice present, then no voice packets are generated from the active call.

The CPS-PT 20 includes a subcell multiplexing unit (SMU) 22 and a traffic shaping unit 24. Although not shown, the MU 22 includes a timer. As was explained above, for conventional subcell multiplexing the timer value is fixed, a value of 30 ms is typical.

The conventional sub-cell multiplexing unit experiences shortcomings in several situations. For example, when there are very few active calls present, and a telephony event is generated by one of the active calls, a Type 3 packet is generated. A Type 3 packet is a special signaling packet used in AAL2 that indicates a telephony event. Because the length of the Type 3 packet is very small compared to the length of a fully filled ATM cell, the Type 3 packet will have to wait until the rest of the ATM cell is filled. This is especially likely to occur when there are only one or two active calls present.

Another situation is when the VAD 14 is on, and no packets are generated by the active call. However, as soon as the speaker begins to speak, voice packets are generated. The very first packet of any such voice spurt is necessarily delayed until the cell is completely filled. Additionally, conventional sub-cell multiplexers give no consideration to the number of active voice calls present and the corresponding impact on the average cell traffic generation profile of the VC. Consequently, the jitter will increase when the number of active calls on a VC suddenly drops. Also, conventional sub-cell multiplexers do not make use of information that can be obtained from special AAL2 packets generated by the CIDs, packets such as the Silence Indication (SID) packets.

FIG. 6 is a block diagram illustrating an example subcell multiplexing unit 22 (see FIG. 5) according to some embodiments of the invention. The SMU 22 includes a common use timer (Timer_CU) 22a and a Connection Admission Controller (CAC) module 22b. The Timer_CU 22a initially contains a default timer value (T). An example value for the default timer value T is 30 ms. As explained above, in conventional VoAAL2 applications, this timer value is fixed.

The CAC module 22b keeps track of the packet length (P), in units of bytes, and the packet rate (R), in units of packets per second, for each of the existing CIDs on the AAL2 VC. The CAC module 22b may update these P and R values whenever a CID is added or deleted from the subcell multiplexed AAL2 VC, and/or it may update the values of P and R whenever an upspeed or downspeed occurs on any of the CIDs. An upspeed or downspeed is indicated when properties of the codec 12, the packetization period and/or the packet rate and the VAD properties for a CID change. The CAC module 22b will notify the CPS-PT 20 about any P and R value changes. Whenever such a change to the P, R values occur, the CPS-PT 20 may modify the default timer value T by a delta ($\Delta$) that is dependent upon the P, R value changes. This process will be explained in greater detail below.

Depending on the VAD setting (VAD_ON or VAD_OFF) for each individual CID, the instantaneous P and R values for the CID will vary. The CPS-PT 20 may monitor the specialized packets generated by the DSP 10 when these transitions occur. For example, the DSP 10 generates Silence Indication (SID) packets when the VAD 14 transitions to the VAD_ON state. Likewise, the first voice packet generated after reception of SID packets represents a transition to the VAD_OFF state. By tracking the arrival of these specialized packets at the SMU 22, the CPS-PT 20 can use actual VAD state changes to determine changes in T rather than using a theoretical factor. This process will be explained in greater detail below.

Furthermore, for each active call (CID) on the virtual circuit, the CPS-PT 20 may track the number of times (V) per unit time that the Timer_CU 22a actually expires. In other words, the CPS-PT 20 tracks the frequency at which partially filled cells are sent because the default timer value T for that cell has expired before the AAL2 cell is completely filled. For each such partially filled AAL2 cell, the CPS-PT 20 may also record a bandwidth wastage factor (W), or in other words the percentage of the AAL2 cell that was unfilled. Whenever the V, W values change, the CPS-PT 20 may make modifications to the default timer value T by some multiple of delta ($\Delta$).

Consequently, embodiments of the invention can adaptively adjust the default timer value T to optimize the delay experienced by AAL2 packets based upon current voice traffic conditions. Embodiments of the invention also jointly minimize the number of times (V) that a partially filled AAL2 cell is forwarded and the bandwidth wastage factor (W) for such a cell.

Further details of the algorithm according to embodiments of the invention are presented in the paragraphs below.

The amount of interpacket delay in milliseconds for packets associated with a particular active call ($CID_i$) may be defined as $G_i = 1000/R_i$, where $R_i$ is the packet rate from $CID_i$ in units of packets/second.

If the total number of CIDs (N) that are multiplexed into a particular AAL2 virtual circuit is equal to one, the maximum delay experienced by a packet may be defined as:

$$D_{MAX} = \left\lceil \frac{47}{(P_i/G_i)} \right\rceil msec = \left\lceil \frac{47 * 1000}{P_i R_i} \right\rceil msec$$

where $P_i$ is the size of CPS packets, including the header, from $CID_i$ (in units of bytes). For voice applications, $P_i$ is usually less than 45 bytes.

For the general case (N>1), the maximum delay experienced by a packet is:

$$D_{MAX} = \left\lceil \frac{47}{\sum_{i=1}^{N} (P_i/G_i)} \right\rceil msec = \left\lceil \frac{47 * 1000}{\sum_{i=1}^{N} P_i R_i} \right\rceil msec$$

The above delays hold true when the value of T (the default timer value) is arbitrarily large.

However, in the VoAAL2 situations described above, the actual maximum delay experienced by a packet is:

$$D_{MAX} = \min\left(T, \left\lceil \frac{47}{\sum_{i=1}^{N} (P_i/G_i)} \right\rceil\right) msec$$

Note that whenever VAD 14 transitions to a VAD_ON state for a particular CID, the corresponding $R_i$ for that CID becomes zero.

Whenever there is an upspeed or a downspeed for a particular CID, the $P_i$, $R_i$ values for that CID change. According to the equations presented above, it is apparent that the $D_{max}$ value for the subcell multiplexing unit 22 also changes.

According to embodiments of the invention, the CPS-PT 20 keeps track of the $D_{max}$ value as given in the general case above for the AAL2 VC and changes the value of T accordingly. In other words, the timer value T is maintained at less than or equal to $D_{max}$ to remove the excess delay caused by the CPS-PT 20.

According to embodiments of the invention utilizing the algorithm described above, the delay experienced by the first packets of any talk spurt in a CID is minimized by adaptively adjusting to the current call load on the AAL2 virtual circuit. Embodiments of the invention utilizing the algorithm described above minimize the jitter introduced by the AAL2 subcell multiplexer by smoothing out the waiting time experienced by each of the partially filled AAL2 cells inside the subcell multiplexer. Embodiments of the invention utilizing the algorithm described above also make use of actual VAD state changes to determine changes in the timer value T rather than use theoretical values.

It may be noted that the changes in T become more frequent and apparent when N is a smaller number and also when the total number of active voice calls on a virtual circuit drops suddenly. For a large value of N and high percentage of active CIDs the variation in T is small. For a smaller number of active calls, the probability of more than one 50% of the active calls getting into the VAD_ON state also increases. Consequently, use of the conventional theoretical VAD factor is less appropriate to compensate for jitter. Embodiments of the invention handle the above situation nicely.

According to embodiments of the invention, the CPS-PT 20 may also track $D_{max}$ using a single linear equation containing no summations, thereby keeping the required computing power to a minimum. Suppose, as outlined above, the $P_i$, $R_i$ values for a particular CID change because of CID addition/deletion, SID detection (in other words, a VAD state change), or upspeed/downspeed changes in the CID. The new maximum delay experienced by the packets may then be calculated from the old maximum delay and the old and new values of $P_i$, $R_i$ using the following equation:

$$D_{\max(new)} = \frac{1}{\left[\frac{1}{D_{\max(old)}} + \frac{(P_{new}R_{new} - P_{old}R_{old})}{47*1000}\right]} msec$$

For the above equation it should be noted that when a new CID is added, $P_{old}=R_{old}=0$; when a CID is deleted, $P_{new}=R_{new}=0$; when VAD 14 is in the VAD_ON state, $R_{new}=0$; and during upspeed/downspeed changes in the CID, both P and R change.

Furthermore, embodiments of the invention may also increase the quality of voice communication over a VoP network by classifying the type of packets. For example, in VoAAL2 subcell multiplexing, it was explained above how Type 3 signaling packets that indicate a telephony event are generated along with the voice packets. The length of a Type 3 packet is much smaller than that of a fully filled ATM cell. Conventionally, no distinction is made between a Type 3 packet indicating a telephony event and a voice packet, thus the Type 3 packets are subjected to the same delays experienced by the other voice packets.

Thus, according to some embodiments of the invention, packets may be classified to achieve expedited processing of priority packets. For example, with continued reference to the VoAAL2 scenario outlined above, the CPS-PT 20 of FIG. 5 may cause Type 3 telephony packets to be forwarded immediately upon receipt by the subcell multiplexing unit 22. Thus, Type 3 packets may be forwarded without incurring any delay in the SMU 22.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. For instance, while the exemplary embodiments described above were directed at voice packet communication using ATM Adaptation Layer 2, the inventive concepts could be applied equally as well to other types of packet networks using other protocols within the scope of the appended claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

Many of the specific features shown herein are design choices. Packet and cell lengths, the number of active calls, the fields contained within cell headers and payloads, etc., are all merely presented as examples. For instance, it is anticipated that the inventive concepts illustrated in the above embodiments might be applied to some other packet formats that do not implement an ATM adaptation layer. Likewise, functionality shown embodied in a single functional block may be implemented using multiple cooperating circuits or blocks, or vice versa. Such minor modifications are encompassed within the embodiments of the invention, and are intended to fall within the scope of the appended claims.

We claim:

1. A device comprising:
 a digital signal processor that is configured to convert a plurality of voice signals into voice packets, the digital signal processor having a voice activity detector that is configured to monitor the plurality of voice signals; and
 a packet transmitter having a subcell multiplexing unit configured to adaptively adjust a maximum delay time experienced by a voice packet based upon a state change of the voice activity detector;
 wherein the subcell multiplexing unit comprises:
 a connection admission controller configured to monitor a packet length and a packet rate for each of the plurality of voice signals and configured to signal the packet transmitter when a change in the packet length and the packet rate occurs;
 wherein the packet transmitter is configured to adjust the maximum delay time based upon the change in the packet length and the packet rate; and
 wherein a new maximum delay time is calculated based upon the following formula:

$$D_{\max(new)} = \frac{1}{\left[\frac{1}{D_{\max(old)}} + \frac{(P_{new}R_{new} - P_{old}R_{old})}{47*1000}\right]} msec$$

wherein $P_{old}$ and $P_{new}$ represent an old and a new packet length, respectively, wherein $R_{old}$ and $R_{new}$ represent an old and a new packet rate, respectively, and wherein $D_{max(old)}$ represents an old maximum delay value.

2. The device of claim 1, the subcell multiplexing unit configured to multiplex a voice packet containing a specialized signaling packet immediately, without regard to the maximum delay time.

3. The device of claim 1, wherein the voice packets are configured to be transmitted over a network chosen from the group consisting of an asynchronous transfer mode network, an X.25 protocol network, and a frame relay network.

4. A voice over packet gateway comprising:
 a digital signal processor configured to generate a plurality of voice packets, each voice packet containing a channel identifier indicating one of a plurality of active calls from which the each voice packet was derived;
 a voice activity detector configured to monitor the plurality of active calls and cause the digital signal processor to generate silence indication packets when any of the plurality of active calls drops below a signal threshold level;

a subcell multiplexing unit configured to multiplex an ATM cell that is only partially filled with voice packets into a virtual circuit after a timer value expires; and a control module configured to adjust the timer value based upon a frequency at which the silence indication packets are received by the subcell multiplexing unit.

5. The gateway of claim 4, the control module farther configured to adjust the timer value based upon a number of times that a voice packet is multiplexed during a unit time period.

6. The gateway of claim 5, the control module farther configured to adjust the timer value based upon a bandwidth wastage factor of the ATM cell.

7. The gateway of claim 4, the control module farther configured to adjust the timer value based upon a frequency that silence indication packets are generated by the digital signal processor.

8. The gateway of claim 4, the control module further configured to maintain the timer value at a level no greater than a maximum delay experienced by a voice packet.

9. The gateway of claim 8, wherein the maximum delay is calculated from the following equation:

$$D_{MAX} = \left[\frac{47*1000}{\sum_{i=1}^{N}(P_i R_i)}\right] msec$$

where N is a number of active calls on the virtual circuit, $P_i$ is the packet length of the $i^{th}$ active call in units of bytes, and $R_i$ is the packet rate of the $i^{th}$ active call in units of packets per second.

10. The gateway of claim 9, wherein the maximum delay is recalculated upon occurrence of an event chosen from the group consisting of a deletion of at least one of the number of active calls from the virtual circuit, an addition of at least one of the number of active calls to the virtual circuit, and an upspeed/downspeed adjustment in at least one of the number of active calls.

11. The gateway of claim 7, wherein the subcell multiplexing unit is further configured to detect a signaling packet in the payload of a voice packet and forward the signaling packet without regard to the timer value.

12. A method comprising:

adaptively adjusting a default timer value in a subcell multiplexer to optimize a delay experienced by a voice packet in response to a voice traffic condition;

wherein adaptively adjusting the default timer value comprises:

monitoring a packet rate and a packet length of a plurality of voice calls; and calculating a maximum delay experienced by the partially filled voice packet based upon a change in the packet rate and the packet length; and wherein calculating the maximum delay comprises:

calculating the maximum delay with the following formula, $$D_{max(new)} = \frac{1}{\left[\frac{1}{D_{max(old)}} + \frac{(P_{new}R_{new} - P_{old}R_{old})}{47*1000}\right]} msec$$

wherein $P_{old}$ and $P_{new}$ represent an old and a new packet length, respectively, wherein $R_{old}$ and $R_{new}$ represent an old and a new packet rate, respectively, and wherein $D_{max(old)}$ represents an old maximum delay value.

13. The method of claim 12, wherein adaptively adjusting the default timer value further comprises setting the default timer value to be no greater than the maximum delay.

14. The method of claim 12, further comprising:

differentiating between a voice packet and a signaling packet that is generated along with the voice packet; and forwarding an ATM cell, even if it is partially filled, immediately upon receiving the signaling packet among the voice packets.

15. The method of claim 14, wherein the signaling packet is a Type 3 packet used in VoAAL2 subcell multiplexing.

* * * * *

UNITED STATES PATENT AND TRADEMARK OFFICE
CERTIFICATE OF CORRECTION

PATENT NO. : 7,376,148 B1  Page 1 of 1
APPLICATION NO. : 10/765540
DATED : May 20, 2008
INVENTOR(S) : Jisu Bhattacharya et al.

It is certified that error appears in the above-identified patent and that said Letters Patent is hereby corrected as shown below:

On the Title Page Item (56) OTHER PUBLICATIONS, delete "suglayer" and insert -- sublayer --.

At column 9, line 10, delete "farther" and insert -- further --.

At column 9, line 14, delete "farther" and insert -- further --.

At column 9, line 17, delete "farther" and insert -- further --.

At column 10, line 1, delete "claim 7," and insert -- claim 4, --.

Signed and Sealed this

Twenty-second Day of December, 2009

David J. Kappos
*Director of the United States Patent and Trademark Office*